UNITED STATES PATENT OFFICE.

MELCHIOR BÖNIGER AND JAN LAGUTT, OF BASLE, SWITZERLAND, ASSIGNORS TO CHEMISCHE FABRIK, VORMALS SANDOZ, OF SAME PLACE.

GREEN TRISAZO DYE AND PROCESS OF MAKING SAME.

SPECIFICATION forming part of Letters Patent No. 627,679, dated June 27, 1899.

Application filed March 1, 1899. Serial No. 707,378. (Specimens.)

*To all whom it may concern:*

Be it known that we, MELCHIOR BÖNIGER, doctor of philosophy, chemist, and JAN LAGUTT, chemist, both residing at Basle, Switzerland, have invented new and useful Improvements in the Manufacture of Green Trisazo Dyes, of which the following is a specification.

This invention relates to the production of new trisazo dyestuffs dyeing unmordanted cotton in green shades fast to alkalies by combining in an alkaline solution one molecule of a tetrazotized paradiamin with one molecule of the monoazo dye formed by coupling in a mineral-acid solution the diazodichlorbenzene 1.2.4 or 1.2.5 with 1.8 amidonaphtol, 3.6 disulfonic acid, and one molecule of a phenolic compound, such as phenol, ortho or meta cresol, resorcinol, salicylic acid, or orthocresotinic acid, the dyestuffs thus obtained being alkaline salts of acids having the following general formula:

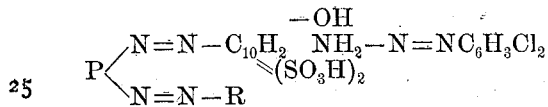

P representing the radical of the paradiamin such as diphenyl, ditolyl, dimethoxydiphenyl or the like, and R the phenolic compound. Green trisazo dyes of similar constitution are protected by Letters Patent Nos. 514,599 and 585,104. The coloring-matters there described are, however, very sensitive to alkalies, so that, for instance, when dyed in a bath containing more than ten per cent. of sodium carbonate of the weight of the cotton they are entirely destroyed, whereas our new green trisazo colors when dyed in the same way or even with one hundred per cent. of sodium carbonate show after washing with water the same pure green shades as when dyed in a neutral bath. This valuable property is of great advantage, especially in dyeing mixed shades—for instance, if the green is dyed in combination with coloring-matters which are preferably dyed in an alkaline bath, such as blacks, browns, dark blues, &c.

In carrying out our process practically we proceed as follows:

Example I: 34.1 kilos of the acid sodium salt of 1.8 amidonaphtol 3.6 disulfonic acid, one hundred per cent., are dissolved in four hundred liters of water by addition of five kilos of sodium carbonate and then precipitated with thirty kilos of muriatic acid of 21° Baumé. The finely-divided paste thus obtained is combined while stirring well with the diazo compound prepared by diazotizing an ice-cold solution of 16.25 kilos of dichloranilin ($NH_2$: Cl: Cl 1:2:5) in three hundred liters of diluted muriatic acid of 7.3 per cent. with 6.9 kilos of sodium nitrite. The reaction is finished within about twelve hours. The monoazo dye thus formed represents a brown-red paste easily soluble in alkalies with a violet-red color. The acid paste of this monoazo dye is then mixed with the tetrazodiphenyl solution obtained in the well-known manner from 18.4 kilos of bezidin, and the resulting mixture, thoroughly stirred up, is afterward poured slowly into an ice-cold solution of forty kilos of sodium carbonate in four hundred liters of water. After having been stirred for an hour the black precipitation of the intermediate product is then combined with a solution of twenty kilos of phenol in ten kilos of ammonia of sixteen per cent. and fifty liters of water. The mixture is allowed to stand for about twenty hours, care being taken to stir from time to time. The combination is then completed, and the fine dark-green precipitate is filtered, dried, and pulverized. The dyestuff thus obtained represents a dark powder with a bronze-like luster soluble with a green color in water, methylic alcohol, and spirit. The solution in strong sulfuric acid is of a dark-violet coloration. Reducing agents—as, for instance, zinc-dust in presence of soda-lye—destroy the green color, and by boiling the colorless solution thus obtained the characteristic strong smell of the dichloranilin distilling with steam will be observed.

The new trisazo color dyes unmordanted cotton in a neutral or alkaline bath and also wool and silk in an acid or neutral bath in presence of Glauber salt or common salt green shades fast to light and alkali carbonate.

Example II: The acid paste of the monoazo dye formed according to the foregoing example from 16.25 kilos of 1.2.4 dichloranilin and 34.1 kilos of 1.8 amidonaphtol 3.6 disulfonic acid is made alkaline by addition of thirty-five kilos of caustic soda dissolved in one hundred liters of water. The violet-red solution thus obtained is allowed to pour into the finely-divided yellow paste of the intermediate product prepared in the usual manner from the tetrazo compound of 18.5 kilos of benzidin, fourteen kilos of salicylic acid, four kilos of caustic soda, and fifteen kilos of sodium carbonate. The mixture diluted to ten thousand liters is stirred up from time to time during a week. As soon as the precipitate has turned entirely into dark-green flakes it is boiled up, and the dyestuff is precipitated by addition of three hundred kilos of common salt filtered, dried, and pulverized. It dyes unmordanted cotton nearly the same green shade as the trisazo color of the Example I.

Similar green dyestuffs can be prepared by using in the foregoing examples the tetrazo compounds of tolidin, dianisidin, æthoxybenzidin, and the like in place of benzidin and by substituting the phenol by ortho or meta cresol or resorcinol and the salicylic acid by ortho-cresotinic acid. It may also be stated that in all these cases the 1.2.5 dichloranilin can be replaced by the isomeric 1.2.4 dichloranilin.

Now what we claim, and desire to secure by Letters Patent, is the following:

1. The process for the production of new green trisazo dyestuffs which consists in combining in an alkaline solution to a so-called intermediate product one molecule of a tetrazotized paradiamin with one molecule of the monoazo dye, resulting from the combination in an acid solution of one molecule of diazodichlorbenzene with one molecule 1.8 amidonaphtol 3.6 disulfonic acid and coupling the intermediate product thus obtained in an alkaline solution with one molecule of a phenolic compound of the benzene series, substantially as set forth.

2. The process for the production of new green trisazo dyestuffs which consists in combining one molecule of a tetrazotized paradiamin with one molecule of an orthoöxycarbonic acid of the benzene series; in an alkaline solution to a so-called intermediate product and coupling the intermediate product thus obtained in an alkaline solution with one molecule of the monoazo dye resulting from the combination of one molecule diazodichlorbenzene with one molecule of 1.8 amidonaphtol 3.6 disulfonic acid in an acid solution, substantially as set forth.

3. As a new article of manufacture a new green trisazo dye derived from one molecule of a tetrazotized paradiamin one molecule of the monoazo dye dichlorbenzeneazo 1.8 amidonaphtol 3.6 disulfonic acid and one molecule of a phenol representing dark powders dissolving in water, methylic alcohol and spirit with a green, in strong sulfuric acid with a dark violet color regenerating by reduction with zinc-dust and soda-lye dichloranilin and dyeing unmordanted cotton green shades, substantially as set forth.

4. As a new article of manufacture a new green trisazo dye derived from one molecule of a tetrazotized paradiamin one molecule of the monoazo dye dichlorbenzeneazo 1.8 amidonaphtol 3.6 disulfonic acid and one molecule of a phenolorthocarbonic acid representing dark powders dissolving in water, methylic alcohol and spirit with a green in strong sulfuric acid with a dark violet color regenerating by reduction with zinc-dust and soda-lye dichloranilin and dyeing unmordanted cotton in green shades, substantially as set forth.

In testimony whereof we have signed our names to this specification in the presence of two subscribing witnesses.

MELCHIOR BÖNIGER.
JAN LAGUTT.

Witnesses:
GEORGE GIFFORD,
JOHN GEORGE PLATNER.